May 26, 1953 WILLIAM IEU-LIANG WU 2,640,150

TUNER

Filed Jan. 24, 1949 2 Sheets-Sheet 1

INVENTOR.
WILLIAM IEU-LIANG WU
BY M. A. Hayes
ATTORNEY

May 26, 1953 — WILLIAM IEU-LIANG WU — 2,640,150

TUNER

Filed Jan. 24, 1949 — 2 Sheets-Sheet 2

INVENTOR.
WILLIAM IEU-LIANG WU

BY [signature]

ATTORNEY

Patented May 26, 1953 2,640,150

UNITED STATES PATENT OFFICE 2,640,150

TUNER

William Ieu-Liang Wu, Shanghai, China, assignor to the United States of America as represented by the Secretary of the Navy Application January 24, 1949, Serial No. 72,302

3 Claims. (Cl. 250—15)

This invention relates to radio communication apparatus, and more particularly to such apparatus for transmitting a predetermined signal in response to a received signal.

The present application is a continuation-in-part of my copending application, Serial Number 604,066, filed July 9, 1945, and entitled "Communication System," now U. S. Patent No. 2,532,589, patented December 5, 1950.

A primary object of the invention is to provide an automatic tuning and control system for a receiver and a transmitter embodied in an apparatus as above-mentioned.

Another object is to provide such an apparatus having means for establishing an accurate frequency reference matching the frequency of a received signal, and for subsequently adjusting an oscillator or transmitter to that frequency.

A further object is to provide an improved servo tuner arrangement adapted for use in the communication apparatus of the present invention.

According to the invention, a radio receiver is provided with a discriminator or other frequency-sensitive device, which discriminator is coupled to a ring-modulator, or the like, to control the operation of an alternating-current tuning motor. The arrangement operates as a servo-system, and first tunes the receiver to the center frequency of a received signal, and subsequently, by means of another motor, tunes the oscillator or transmitter so as to transmit a signal of the frequency to which the receiver was preliminarily tuned.

For such times that the frequency of the signal applied to the discriminator is outside the operable range of the discriminator, means are provided to unbalance the ring-modulator, and thus to cause searching or sweep-tuning of the receiver, which continues until a signal is received having a frequency value lying within the operable range of the discriminator. The timing and switching means provided for accomplishing the above-described functions are substantially wholly automatic in operation, thereby requiring but a minimum of attention by an operator.

Other objects and many of the attendant advantages of this invention will be readily appreciated as the same becomes better understood by reference to the following detailed description when considered in connection with the accompanying drawing wherein.

Figure 1:
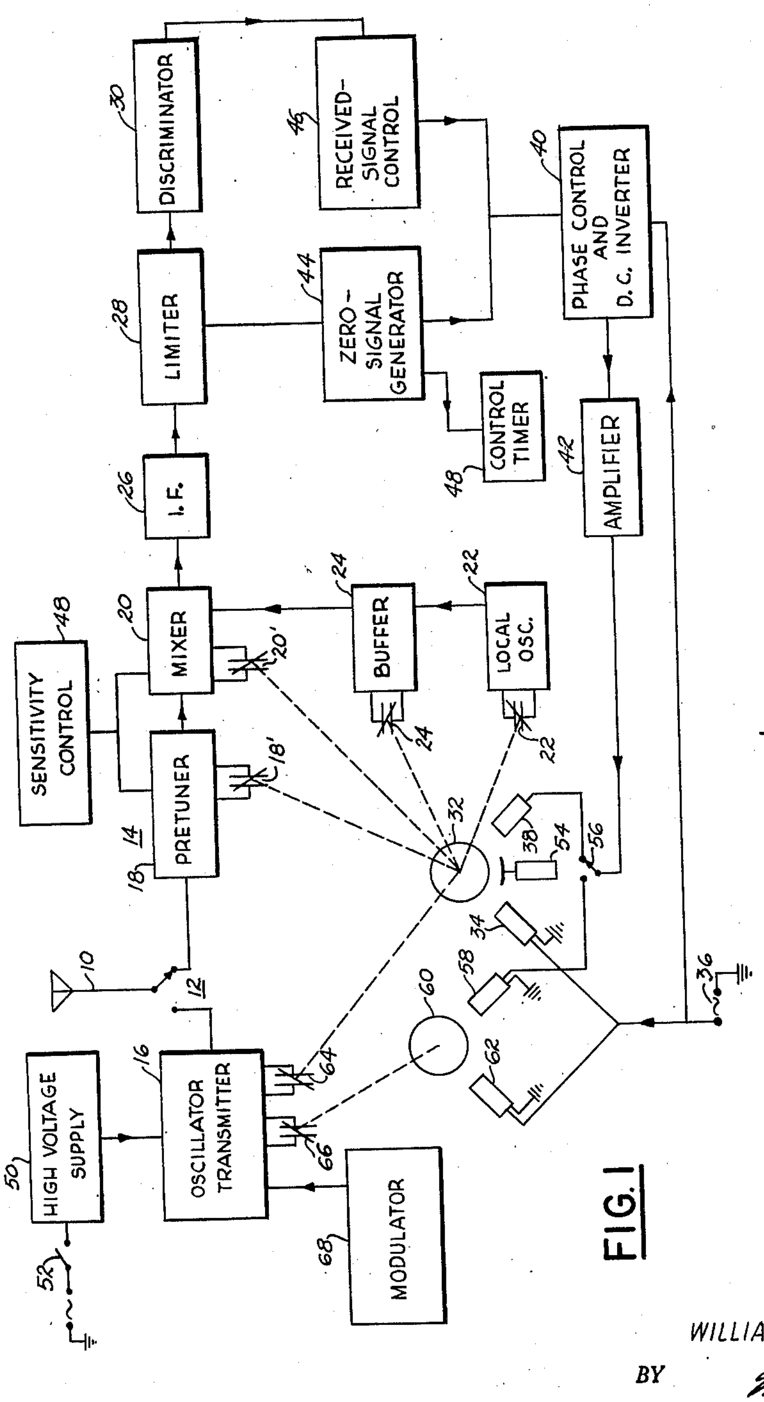
Fig. 1 is a block diagram illustrating a preferred embodiment of the invention.

In Fig. 1, an antenna 10 is adapted to be connected, by means of a switch 12, either to the input of a receiver generally indicated at 14, or to the output of a transmitter 16. The receiver 14 is preferably of the superheterodyne type and includes a pretuner 18, which feeds into a mixer 20, the latter being fed a signal from a local oscillator 22, through a buffer 24 to provide an intermediate-frequency output, as is known. The mixer 20 is followed by one or more intermediate-frequency amplifier stages 26, and, if desired, a limiter 28 having one or more stages arranged to drive a discriminator or other frequency-sensitive circuit 30.

The pretuner 18, mixer 20, local oscillator 22 and buffer 24 are provided with respective variable tuning capacitors 18′, 20′, 22′ and 24′, which are ganged for conjoint drive by a two-phase motor 32. One phase winding 34 of the motor 32 is energized directly from an alternating-current source 36, while the other phase winding 38 is energized from a phase-control and direct-current inverter circuit 40 and amplifier 42.

Part of the output of limiter 28 is fed to a zero-signal control circuit or artificial-signal generator 44, and the output of discriminator 30 is fed to a received-signal control circuit 46. The outputs of the zero-signal and received-signal control circuits 44 and 46 are utilized jointly to control the direct-current inverter 40 in a manner to be described.

As thus far described, the basic elements of a servo tuner have been set forth for tuning the receiver 14 to the center frequency of a received signal. The tuner operates whether the signal is amplitude-modulated, frequency-modulated, or not modulated at all.

For introducing controllable time delay in the operation of switching antenna 10 from receiver to transmitter and, vice versa, a timing circuit 48 is provided, which circuit is initiated under control of the limiter 28 through the zero-signal control circuit 44.

In operation of the receiver tuning system, the tuning capacitors 18′, 20′, 22′ and 24′ are driven by motor 32 to sweep the allocated band at a rapid rate. During this time, inverter 40 is controlled by the zero-signal control circuit 44, and the switch 12 is in its normal or "receive" position, as shown. When a signal of frequency within a predetermined range is received, limiter 28 interrupts the operation of the zero-signal control circuit 44, and simultaneously, control of the direct-current inverter 40 is shifted to the received-signal control circuit 46. Motor 32, in turn, is energized, in response to a voltage signal from the discriminator 30, to actuate the tuning motor 32 to drive the condensers 18′, 20′, 22′ and 24′ in a direction depending on the polarity of the voltage. The tuning operation is terminated at a time when the discriminator yields zero voltage output. The discriminator has such a zero output not only at the center-frequency of a received signal, but also in the total absence of an input signal of frequency lying within the reception band of the discriminator. The zero-signal generator 44 operates thus to control the drive means until a sufficient signal appears in the output of the discriminator 30.

The signal from limiter 28 through the zero-signal generator 44 also initiates a cycle of operation of timer 48, and after a predetermined period, sufficiently long for the receiver tuning to be adjusted to the center frequency of the incoming signal, various changes in operation are effected. Thus, the receiver sensitivity is greatly diminished by means of a sensitivity control circuit 48′. The antenna 10 is switched from the input of receiver 14 to the output of transmitter 16 by actuation of switch 12, and a plate voltage supply 50 for the transmitter 16 is energized through the closing of a switch 52.

Motor 32 is arrested when a brake-actuating solenoid 54 is energized. Concurrently, winding 38 is deenergized by operation of a switch 56, and the output of amplifier 42 is switched to control a winding 58 of a transmitter servomotor 60. The latter is a two-phase motor similar to motor 32, having its second phase winding 62 connected directly to the A.-C. power source 36.

As shown in Fig. 1, transmitter 16 is provided with a main tuning condenser 64 and a vernier tuning condenser 66. Motor 32 drives the main tuning condenser 64 conjointly with the various receiver tuning capacitors 18′—24′, hereinabove described. When the receiver 14 has been adjusted to the center frequency of an incoming signal, transmitter 16 has also been roughly tuned to that frequency. Sufficiently accurate tracking of condenser 64 by means of the tuning controls of the receiver generally is not feasible, however, especially at very high frequencies of operation. It is for this reason that transmitter 16 is provided with the vernier tuning condenser 66 arranged to be adjusted by servomotor 60.

With the transmitter 16 in operation, the antenna 10 no longer furnishes the receiver 14 with energy from the original signal. The receiver 14 is then operating at decreased sensitivity, and furnishes the proper output at discriminator 30 for operating the transmitter servo system, thus perfecting the tuning of the transmitter to the center frequency of the original signal. The receiver, the tuning of which is suitably locked at a desirable output level before the transmitter is operated, constitutes a reference for expeditiously perfecting the transmitter tuning. A modulator 68 can be used with the transmitter 16, for pulse keying, or for either frequency or amplitude modulating the transmitter 16.

As has been described, discriminator 30 functions initially to control the servo tuning of the receiver 14, and subsequently to control the transmitter tuning similarly. Both the transmitter and the receiver are tuned to the center frequency of either an amplitude- or a frequency-modulated signal, the receiver tuning being controlled from an outside signal and the transmitter being controlled by the effect of a signal from the transmitter and received in the tuned receiver.

The buffer 24 is desirably included in the present system when transmitter 16 is of high power output. When the transmitter 16 is turned on, there is an effect on local oscillator 22 resulting from the appearance of a strong signal in mixer 20, which has been noted even with no antenna at the receiver input and with reduced receiver sensitivity. A strong receved signal in the mixer 20 changes the impedance presented to the oscillator 22, and the change in impedance tends to shift the oscillator frequency, thereby to impair the operation of receiver 14 as a true reference for tuning the transmitter 16. Such undesirable interaction is substantially eliminated, and consequently the transmitter tuning is made more accurate, by the inclusion of a buffer 24. If the power output of the transmitter is low or moderate, the buffer stage can be omitted.

Figure 2:
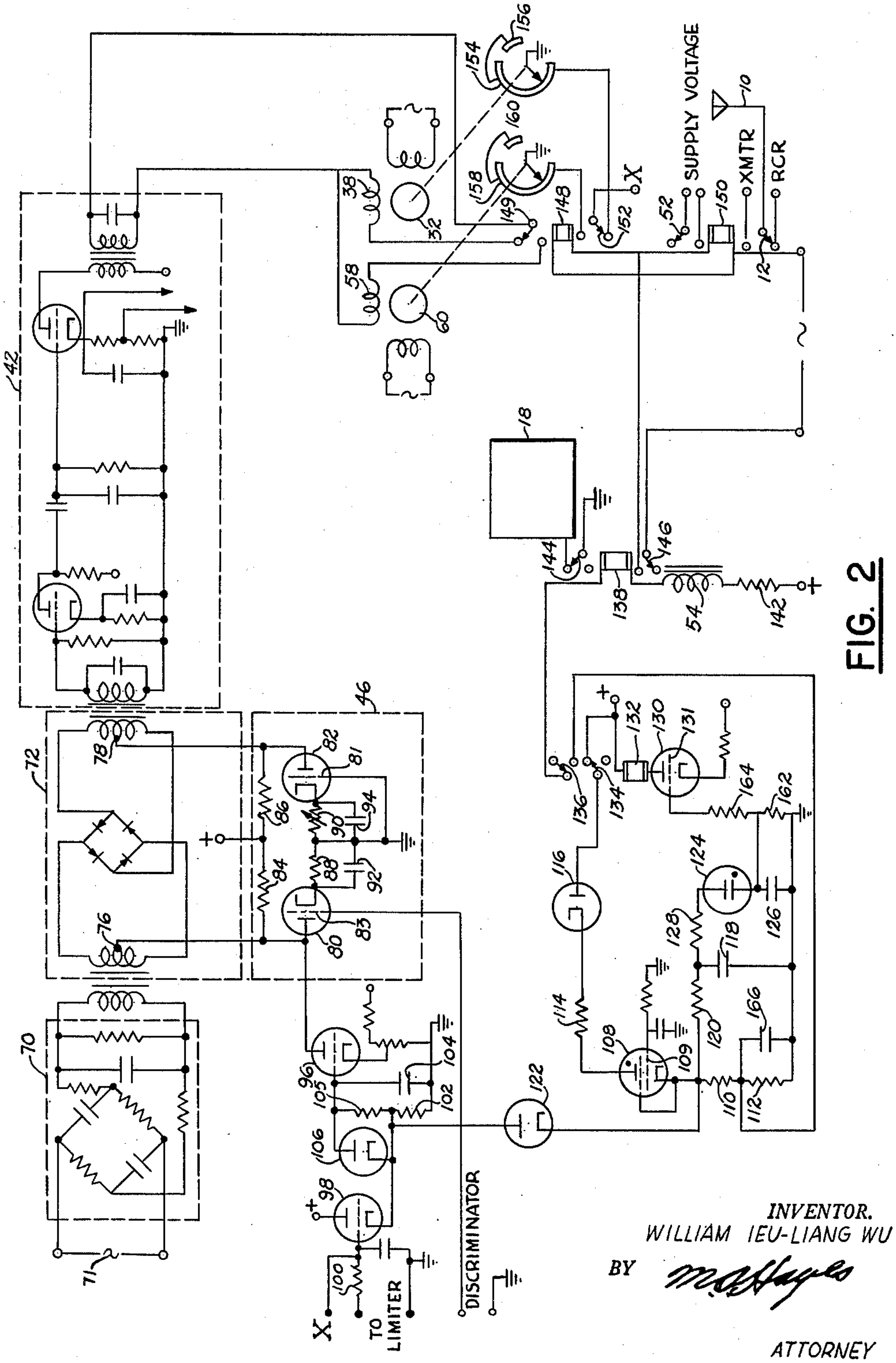
Fig. 2 is a schematic wiring diagram of specific parts of the system shown in Fig. 1.

In Fig. 2, there is shown a wiring diagram of an illustrative servo control and switching system in accordance with the present invention. The phase control and direct-current inverter 40 (Fig. 1) are shown in Fig. 2 as comprising two parts, namely, a phase-control part 70 and D.-C. inverter part 72. The inverter part 72 is utilized to drive a conventional power amplifier 42 to furnish power for the variable or control phase windings 38 and 58 of the receiver and transmitter servomotors 32 and 60, respectively. Received signal control 46 affects D.-C. inverter 72 so as to cause a variable alternating-current output from amplifier 42 when tuning is to be effected. Phase control 70 is so proportioned that the output of the amplifier is balanced, resulting in equal motor torque for both directions of tuning when there are corresponding degrees of detuning.

Unit 72, in the form shown, comprises a ring modulator which, when balanced at points 76 and 78, yields zero input to amplifier 42. When points 76 and 78 are at unequal direct-current potentials, a variable alternating-current input is applied to amplifier 42 from a source of alternating-current supply 71 through the phase control 70. For fuller description of the ring modulator, reference can be made to a paper entitled "Applications of copper oxide rectifiers" by Leo L. Beranek appearing in the July 1939 issue of Electronics, McGraw-Hill Book Company, New York.

Received-signal control circuit 46 is in the form of a balanced direct-current amplifier having two triodes 80 and 82 having respective load resistors 84 and 86, and cathode resistors 88 and 90, respectively, resistor 90 being variable for a purpose to be described. The cathode resistors 88 and 90 are by-passed by capacitors 92 and 94. The junction of resistors 88 and 90 and of capacitors 92 and 94 and the grid 81 of triode 82 are all grounded, as indicated. The plate supply for triodes 80, 82 is derived from any suitable direct-voltage supply.

Grid 83 of triode 80 is energized from one terminal of discriminator 30 (Fig. 1), the other output terminal of which is grounded. With the grid 83 of triode 80 at ground potential, variable resistor 90 is adjusted to balance circuit 46, with the triode plates at equal potential.

So long as there is an output delivered by discriminator 30, control circuit 46 and the ring modulator 72 are unbalanced. The sense and magnitude of unbalance control the phase and output voltage of amplifier 42. When the receiver 14 (Fig. 1) is tuned to the center frequency of a modulated, pulsed or unmodulated carrier, and provided the modulating is not of excessively low frequency, there will be zero output from amplifier 42 and zero motor torque. As the tuning motor approaches the point at which it should stop, the output of amplifier 42 diminishes. Mechanical inertia causes over-travel and the resulting detuning causes motor reversal, the continued process resulting in hunting. The action of discriminator 30 during hunting varies the grid voltage of triode 80 and, normally varies the cathode potential concurrently. However, by using a large plate resistor 84 and critically proportioning capacitor 92 and resistor 88, the resulting unbalance of the direct-current amplifier may be made, in part, a function of the motor velocity. The discriminator output is a function of the degree of detuning, and since the motor velocity is greatest when passing through the desired center frequency, and the velocity is least at the extremes of detuning during the hunting, it is advisable to design resistor 88 and condenser 92 so as to provide a velocity damping term, greatly to reduce the frequency and amplitude of the hunting.

Figure 3:
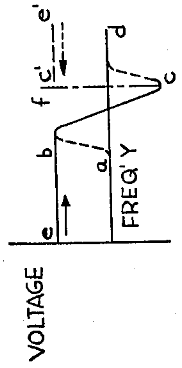
Fig. 3 is a graphical representation of certain operating characteristics.

In Fig. 3, there are shown performance curves. Curve *a, b, c, d,* comprising dotted curve *a—b*; solid curve *b—c*; and dotted curve *c—d* represent a typical discriminator output variation above and below a center frequency *f*. The tuning action under discriminator control is effected when the discriminator output is between points *b* and *c* along solid curve *b—c*.

The motor windings are so connected that there would be tuning away from *f* with voltage *a—b* or *c—d* effectively impressed on the grid of triode 80 (Fig. 2). For frequencies outside the range *b—c*, zero- or artificial-signal generator 44 (Figs. 1 and 2) is arranged to cause unbalance of inverter 72, not only to overcome the adverse effects of voltages *a—b* and *c—d*, but also to cause sweep-tuning at a high rate when the input signal is outside the range of appreciable discriminator output.

As shown in Fig. 2, a suitably biased triode 96 has its plate connected to the plate of triode 80, and unbalances the circuit 46 sufficiently to develop a driving voltage for the tuning motor. Another triode 98 is provided, the grid of which is returned to ground through isolating resistor 100 and the conventional grid-return resistor (not shown) of limiter 28 (Fig. 1). The cathode current of triode 98 develops a positive potential across a resistor 102, charging capacitor 104 correspondingly, and counterbalancing a part of the bias potential between the cathode and ground of triode 96. So long as the signal at the limiter grid is low, triode 96 passes a normal plate current and causes suitable unbalance of the inverter 72.

When the tuning is within sufficiently close range of a carrier to initiate limiter action, triode 98 is driven to cutoff. It is essential that the limiter not block the zero-signal control circuit 44 outside the range *b—c*, and preferably, the limiter is adjusted to permit operation of circuit 44 in the end regions of range *b—c* to insure tuning in the proper sense. The voltage across resistor 102 is diminished and triode 96 is cut off by the bias in its cathode return. A rectifier 106, connected between triodes 96, 98, instantly discharges capacitor 104. The same signal that caused operation of limiter 28 and cut-off of tubes 96 and 98 in circuit 44 also provides an output signal from discriminator 30, whereby servo-tuning is under control of the signal after sweep-tuning ceases.

In the event that low-frequency, pulsed or modulated signals are utilized, the limiter may permit renewed operation of triode 96; but before the grid of triode 98 can rise to a sufficient positive potential relative to ground to overcome its cathode cutoff voltage, large capacitor 104 must be charged through large resistor 105.

There has thus been described the structure and operation of the part of the circuit arrangement of Fig. 2 that relates to the servo tuning devices. In the following description the part of the circuit arrangement that relates to control switching will be considered.

A thyratron 108 is normally non-conductive because of the bias developed across resistor 102 by the plate current of triode 98. Control grid 109 of thyratron 108 is maintained at ground potential, as indicated. Resistors 110 and 112 are of relatively large magnitude, and normally constitute a negligible shunt across resistor 102. Resistor 114 connected in the plate circuit of thyratron 108 is for limiting the maximum potential to which the thyratron cathode can rise when the thyratron is fired, and rectifier 116 prevents excess thyratron current during the warm-up interval.

Accordingly, when the limiter 28 (Fig. 1) has driven triode 98 (Fig. 2) to cutoff, and the bias across resistor 102 is diminished, as described above, thyratron 108 fires and charging of a capacitor 118 is initiated. A resistor 120 limits the charging rate and provides a delay interval. The thyratron cathode is raised to a very high voltage, but such voltage rise does not affect triodes 96 and 98 because of the presence of an intervening, blocking rectifier 122.

When capacitor 118 has been charged to sufficiently high value, which occurs after a desired time delay, a neon glow tube 124, in circuit with the capacitor 118, fires and charges a capacitor 126 connected in series with the neon tube 124. A resistor 128 guards against excessive charging current and protects the neon tube 124. At the instant that tube 124 fires, the grid 131 of a triode 130 is driven positive and the triode 130 passes sufficient current to energize a relay 132 in the plate circuit of tube 130. A resistor 164 is desirably connected in the circuit between tubes 124 and 130 to limit the grid current.

Energization of relay 132 causes normally closed contact 134 to open, and the thyratron plate is thereby de-energized. Normally open contact 136 is closed simultaneously with the opening of contact 134, and a relay 138 and brake winding 54 of the receiver tuner motor 32 are energized.

The current through the series circuit including a limiting resistor 142, brake winding 54, relay 138, contacts 136 and resistor 112 to ground develops a sufficient bias to retain the thyratron 108 at cutoff so long as relay 132 is energized. Relay 138 operates a contact 144 to break the cathode return circuit of the pretuner, generally indicated at 18, thereby to reduce the sensitivity of the receiver. A contact 146, normally open, is closed concurrently with the actuation of contact 144, and causes energization of a pair of serially connected relays 148 and 150. Relay 150 operates switch 12 to shift antenna 10 from the receiver input to the transmitter output terminal. Energization of relay 150 also closes a contact 52 for energizing the primary of the transmitter high-voltage supply 50 (Fig. 1).

Operation of relay 148 actuates a contact 149 to switch the output of amplifier 42 from the control winding 38 of the receiver servomotor 32 to control winding 58 of the transmitter servomotor 60. A second contact 152 is also actuated by relay 148 for switching from grounding contacts 154, 156 of the receiver to contacts 158, 160 of the transmitter, for a reason that will presently be set forth.

As shown in the curve of Fig. 3, the voltage unbalance *e—b* from the zero-signal generator 44 (Fig. 1) causes motor operation in a given direction of rotation, and this rotation may be accompanied by either increasing or decreasing of the tuning frequency. When a received signal interrupts operation of the zero-signal generator 44, the discriminator 30 assumes control of the motor. The polarity of the discriminator output *b—c* is correct for only one-half rotation in the tuning sweep, as indicated by the solid arrow indicating increasing frequency values. Unless some precaution is taken during a reverse frequency sweep, the voltage *e′—c′* in the direction of the dotted arrow from signal generator 44 would be followed by voltage of reverse polarity from the discriminator. This would cause tuning away from the center frequency rather than toward it. In order to prevent this happening, contacts 154 and 158 (Fig. 2) are provided for grounding the grid of triode 98 by means of connections indicated at X, and thus maintaining operation of the artificial or no-signal generator 44 throughout an entire reverse tuning sweep.

If it should be desired to prevent automatic transmitter operation for detected signals within certain sections of the band that is swept, the unbalancing action of triode 98 and associated components can similarly be maintained during a proper half-rotation of the tuning capacitors by grounding terminal X—X through contact segments 156 and 160 of the receiver and transmitter, respectively. This protects certain channels from the interference otherwise caused by the present oscillator or transmitter. Cam operated contacts or the like can be used to replace the driven contact arms and contact segments shown as operated by motors 32 and 60.

With all of the relay contacts in opposite positions from those shown in Fig. 2, the transmitter is in operation. Transmitter servomotor 60 operates vernier tuning capacitor 66 to perfect transmitter tuning, and this is characterized by damped hunting, as described in connection with receiver servo tuning.

The interval of transmission is terminated and all the relays are restored to their initial positions when capacitor 126 has discharged sufficiently through resistor 162 to allow release of contacts 134 and 136. Capacitor 166, which is charged to the voltage across resistor 112 during the "transmit" cycle, maintains the thyratron at cutoff for a short time after contacts 134 close. Thus, a "transmit" cycle is prevented from occurring as the result of limiter response to a transmitter transient. After a short interval, capacitor 166 discharges through resistor 112. In normal operation, the thyratron is cut off by the voltage across resistor 102. Only a part of this voltage charges capacitor 166 because resistor 112 constitutes only a fraction of voltage divider 110, 112. Resistor 110 thus prevents delay in firing of the thyratron that might otherwise be caused by capacitor 166.

Following the "transmit" interval, and provided that the signal that initiated this cycle is still present, there will be a renewed cycle; if not, there will be a resumption of sweep tuning.

Various additional refinements may be considered expedient. Thus, it may be desirable to introduce a further delay timer to continue receiver servo action after application of a friction brake to the receiver tuner, and correspondingly to delay transmitter operation. This is to reduce the tuning error that may appear due to the mechanical detuning caused by brake impact. It may be desired to have a much longer or extended, or a manually terminated interval of transmission than is provided by the constants of any given timing circuit 126, 162, etc. The latter can be changed or replaced by a locked holding circuit, or the like, within the spirit of the invention. Shorting devices 154, 160 might be connected at other points in the organization, as across a tuning capacitor or from antenna to ground. They can in fact be replaced, with additional complication, by an arrangement for reversing the polarity of unbalance caused by triode 96. The time interval consumed in the present embodiment during the reverse, idle sweep would thereby be utilized, but the organization would be somewhat more complex. It may be desired to prevent more than a single transmission from occurring at the frequency of any one cycle-initiating signal. In that event, suitable timing circuits and receiver controls can be added to cause forward tuning of the receiver out of the range of that signal before return to normal search conditions.

Obviously many modifications and variations of the present invention are possible in the light of the above teachings. It is therefore to be understood that within the scope of the appended claims the invention can be practised otherwise than as specifically described.

What is claimed is:

1. In a system for automatically tuning a transmitter to the center-frequency of a received signal within an allocated frequency band, the combination of a receiver including a driven tuning device adapted to sweep said band, means controlled by said receiver to adjust and then interrupt operation of its tuning device when tuned accurately to said center-frequency, a transmitter including a second driven tuning device, means to cause transmitter operation when operation of said receiver tuner is interrupted and simultaneously to decrease the sensitivity of said receiver, the receiver under condition of reduced sensitivity, being operable to provide a signal defining a reference frequency against which the transmitter is tuned, and means to adjust said second tuning device to said reference frequency.

2. The combination as set forth in claim 1, wherein said interrupting means comprises an electrically operated friction brake.

3. The combination as set forth in claim 1, wherein said transmitter is provided with an additional driven tuning device adapted to be actuated conjointly with the actuation of the tuning device of said receiver to provide relatively coarse tuning of the transmitter, said second driven tuning device providing relatively fine tuning thereof.

WILLIAM IEU-LIANG WU.

(References on following page)

References Cited in the file of this patent

UNITED STATES PATENTS

| Number | Name | Date |
|---|---|---|
| 2,363,583 | Gilman | Nov. 28, 1944 |
| 2,369,542 | Dietrich | Feb. 13, 1945 |
| 2,375,133 | Polkinghorn | May 1, 1945 |
| 2,379,395 | Ziegler et al. | June 26, 1945 |
| 2,380,947 | Crosby | Aug. 7, 1945 |
| 2,404,852 | Koch | July 30, 1946 |

| Number | Name | Date |
|---|---|---|
| 2,408,791 | Magnuski | Oct. 8, 1946 |
| 2,412,991 | Labin | Dec. 24, 1946 |
| 2,418,139 | Preisman | Apr. 1, 1947 |
| 2,419,593 | Robinson | Apr. 29, 1947 |
| 2,434,294 | Ginzton | Jan. 13, 1948 |
| 2,447,392 | Byrne | Aug. 17, 1948 |
| 2,462,856 | Ginzton | Mar. 1, 1949 |
| 2,525,442 | Bischoff | Oct. 10, 1950 |
| 2,528,632 | Woodworth et al. | Nov. 7, 1950 |